UNITED STATES PATENT OFFICE.

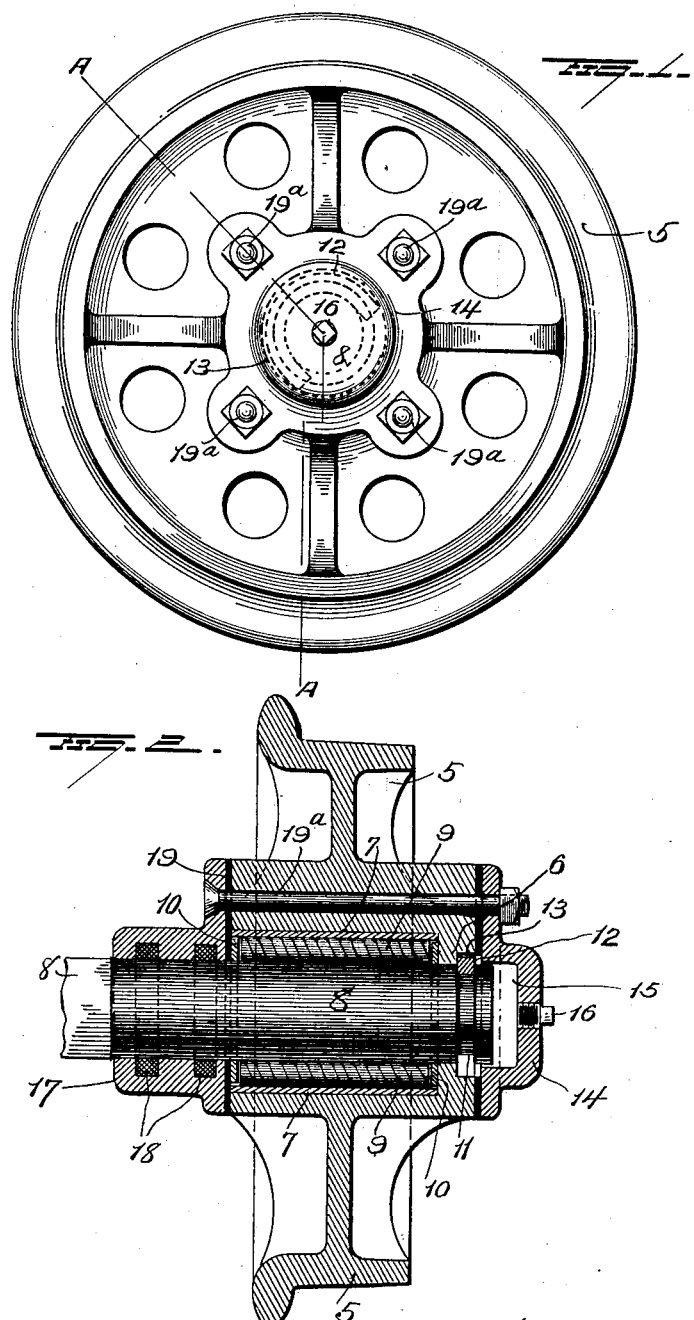

FRANK M. COWGILL, OF COLUMBUS, OHIO, ASSIGNOR TO THE RALSTON STEEL CAR COMPANY, OF COLUMBUS, OHIO.

ROLLER-BEARING FOR CAR-WHEELS.

1,334,019.  Specification of Letters Patent.  Patented Mar. 16, 1920.

Application filed July 29, 1919. Serial No. 314,089.

*To all whom it may concern:*

Be it known that I, FRANK M. COWGILL, a citizen of the United States, and a resident of Columbus, in the county of Franklin and State of Ohio, have invented certain new and useful Improvements in Roller-Bearings for Car-Wheels; and I do hereby declare the following to be a full, clear, and exact description of the invention, such as will enable others skilled in the art to which it appertains to make and use the same.

This invention relates to an improvement in roller bearings for car wheels and particularly wheels designed for use on mine cars, the object being to provide improved means for mounting and detachably securing the wheel on a stationary axle and also for lubricating the bearing, and it consists in the parts and combination of parts and in the details of construction as will be more fully explained and pointed out in the claims.

In the accompanying drawings, Figure 1 is a view in elevation of a wheel embodying my invention and Fig. 2 is a view in section on the line A—A of Fig. 1.

5 represents a car wheel, the hub of which is bored, and counterbored from its inner side forming an annular shoulder 6 projecting into the bore at the outer side of the hub, against which the rollers 9 have end bearing. These rollers 9 are within the counterbored portion of the hub, and surround and have bearing on the fixed axle 8. The counterbored portion of the hub is lined with a suitable metal 7 against which the rollers 9 bear, and the latter are preferably connected at their ends to the rings 10 which hold them in proper relative position.

The axle 8 is provided adjacent its outer end with a peripheral groove 11 which forms a seat for the U-shaped metal yoke 12 which acts as a key and prevents any lateral movement of the wheel on the axle. This yoke projects beyond the periphery of the axle and rests within a recess 13 in the outer end of the hub concentric with the bore of the latter, and is held against lateral movement by a wall of said recess 13 and by the cap 14 secured to the hub of the wheel and closing the outer end of the bore. This cap is recessed as at 15 to form a lubricant chamber for the roller bearing, and is provided with an opening closed by a screw plug 16 through which the lubricant is supplied to said chamber.

The inner end 17 of the hub is made separate from the latter, and forms the end thrust bearing for the inner ends of the rollers 9. This end section 17 is provided with two annular grooves for the packing rings 18 which prevent the seepage of any oil inwardly between the axle and hub, and gaskets of soft metal 19 are interposed between the cap 14 and end section 17, and the body of the hub for preventing any leakage at these points. The end section 17 of the hub and the cap 14 are secured to the body of the hub by the bolts 19ᵃ which pass through said end 17, body of the hub, which is enlarged at the points where these bolts pass, and the cap 14 and solidly lock these parts together, and when the parts are so assembled and secured, the yoke 12 will be held between the cap and shoulder 6 of the hub and prevent any lateral movement of the wheel on the axle, or any endwise movement of the axle in the wheel.

With this construction the bore of the hub is completely sealed against the escape of the lubricant or the entrance of any dust and the wheel is detachably locked to the axle against the possibility of displacement so long as the cap of the hub remains in place.

To get at the parts for inspection or repair it is simply necessary to remove the nuts from the ends of the bolts 19ᵃ thus freeing the cap 14. After the cap has been removed the wheel can be forced inwardly on the axle thus releasing the yoke which may then be removed, and after the yoke has been removed the wheel and its contained bearings is free to be pulled from the axle.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. The combination of an axle having a peripheral groove adjacent its outer end, a car wheel the inner end of the hub of which is separate from the body of the hub, the said end section having an annular groove and a packing within said groove and embracing the axle, roller bearings in the hub and surrounding the axle, a cap for the outer end of the hub, securing means for the end section of the hub and means carried by the axle and engaging the body of the hub and the hub cap for preventing lateral movement of the wheel on the axle.

2. The combination of an axle, a car wheel the inner end of the hub of which is separate from the body of the hub, the said end section having an annular groove carrying a packing ring encircling the axle, roller bearings within the body of the hub, a cap closing the outer end of the hub, means for preventing lateral movement of the wheel on the axle, and bolts passing through the end section of the hub, the body of the latter and the cap for securing these parts together.

3. The combination of an axle having a peripheral groove adjacent its outer end, a wheel the hub of which is counterbored from its inner end, a separate section constituting the inner end of the hub and forming an end wall for the counterbored portion, roller bearings within said counterbored portion of the hub and surrounding the axle, a yoke seated in the groove in the end of the axle, the projecting portion of said yoke resting in a recess in the outer end of the body of the hub and a cap secured to the outer end of the hub and forming an outer stop for the yoke.

4. The combination of an axle having a peripheral groove adjacent its outer end, a wheel the hub of which is counterbored from its inner end, a separate section constituting the inner end of the hub and forming an end wall for the counterbored portion of the hub, roller bearings within said counterbored portion of the hub and surrounding the axle, a cap for the outer end of the hub, bolts passing through the end section and body of the hub and through the cap for locking said parts together and a yoke carried in the groove in the axle and engaging the body of the hub and the cap for preventing lateral movement of the wheel on the axle.

5. The combination of an axle, a wheel the hub of which is counterbored from its inner end, a separate section constituting the inner end of the hub and forming an end wall for the counterbored portion of the hub, roller bearings within said counterbored portion of the hub and surrounding the axle, a cap for the outer end of the hub, the said cap having an oil inlet opening closed by a removable plug, means carried by the axle and engaging the body of the hub and the cap for preventing lateral movement of the wheel on the axle and bolts passing through the end section and body of the hub and through the cap for removably locking the said parts together.

In testimony whereof I have signed this specification in the presence of two subscribing witnesses.

FRANK M. COWGILL.

Witnesses:
H. A. WILFORD,
R. C. MONTGOMERY.